J. R. VAN J. BLINCK.
INSECT TRAP.
APPLICATION FILED NOV. 9, 1915. RENEWED MAR. 1, 1917.
1,229,021.
Patented June 5, 1917.
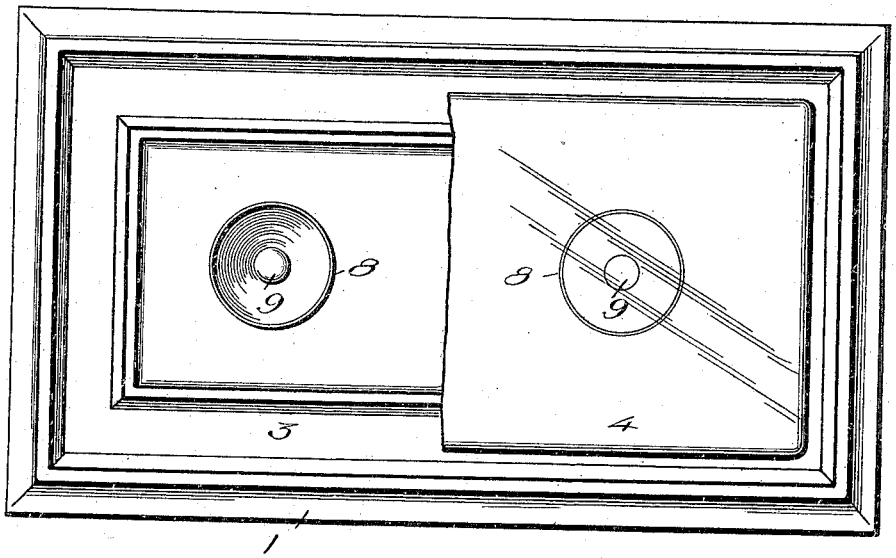
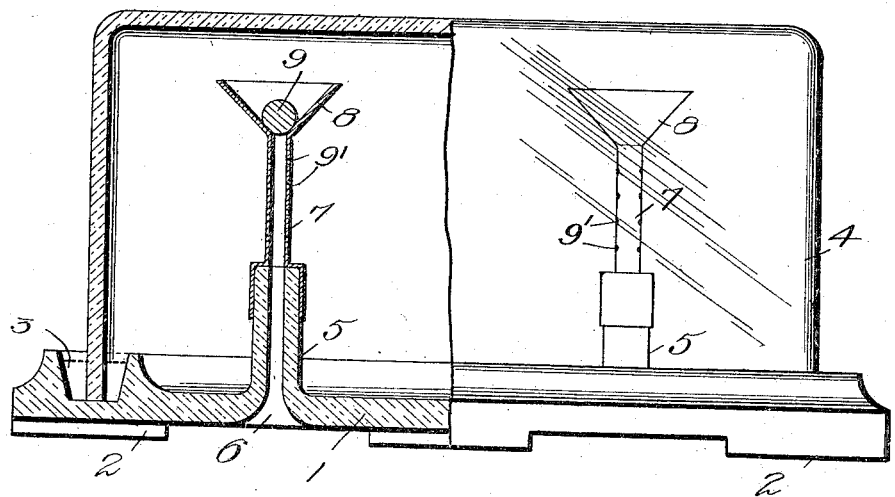
WITNESSES:
INVENTOR
JEAN R. VAN J. BLINCK
ATTORNEYS June 5, 1917.

UNITED STATES PATENT OFFICE.

JEAN R. van J. BLINCK, OF TAMPA, FLORIDA, ASSIGNOR OF ONE-HALF TO WILLIAM GEBHARD BROREIN, OF TAMPA, FLORIDA.

INSECT-TRAP.

1,229,021.  Specification of Letters Patent. Patented June 5, 1917.

Application filed November 9, 1915, Serial No. 60,556. Renewed March 1, 1917. Serial No. 151,813.

*To all whom it may concern:*

Be it known that I, JEAN R. VAN J. BLINCK, a citizen of the United States, and a resident of Tampa, in the county of Hillsboro and State of Florida, have invented a new and useful Improvement in Insect-Traps, of which the following is a specification.

This invention is an improvement in insect traps and consists in certain novel constructions, combinations and arrangements of parts that will be hereinafter described and claimed.

Among the objects of my invention is to provide an insect trap capable of entrapping all kinds of small insects and especially ants.

Another object of my invention is to provide a trap that automatically seals against egress once the insect is within it.

Other objects will appear in the following detailed description of my invention.

In the drawing which constitutes part of this application and in which the same reference characters always refer to the same parts, Figure 1 is a plan view of my invention showing the cover partly broken away, Fig. 2 is a side elevation one-half of which is a central longitudinal section.

The practical embodiment of my invention shown in said drawing comprises a base member 1 provided with relatively broad but thin projections 2 on its inner side, thus allowing for the passage of insects to the openings hereinafter to be described. The upper surface of said base member near its periphery is formed with a relatively deep channel 3 in which the cover member 4 is adapted to rest. Said base member is also formed with one or more columns 5 provided with passageways 6 that extend through the base. These openings are enlarged at the bottom of the base to give the shape of an inverted funnel. This is to promote ingress of insects. The tops of columns 5 are provided with tubular extensions 7 which are flared at their top to provide funnel-like members 8. Within said members 8 are sealing members 9 in the form of balls. The extensions 7 are provided with perforations 9' to allow the odor of bait to escape from the interior.

In the practice of my invention I form the base and cover of glass, the funnel extensions of the entrance columns of metal and the sealing ball of light metal, but it will be readily understood that other materials may be used to the same end. When the trap is assembled, groove 3 is filled with liquid so as to effectually seal the cover.

From the above detailed description, it will be apparent that insects with their natural tendency for crawling up will go up passage 6, and move ball 9 sufficient to insure ingress to the trap whereupon the ball will fall back into a position of rest thereby effectually sealing the trap against egress of the insect.

I claim:—

1. An insect trap comprising a base of glass provided with legs and a groove extending completely around the edge portion of its upper surface, a plurality of integral projections extending upward from the portion of said upper surface bounded by said groove, said projections being each provided with an opening extending through the base, perforated metallic extensions terminating in funnel-shaped tops mounted on said projections, each extension provided with an opening adapted to communicate with the funnel of its respective extension and the opening in its respective projection, a metallic sealing ball mounted in each funnel-shaped top, and a cover mounted in said groove and adapted to be sealed therein.

2. An insect trap comprising a base provided with legs and having a groove extending completely around the edge portion of its upper surface, a plurality of projections extending upward from the portion of said base bounded by said groove and provided with an opening extending through the base, extensions terminating in funnel-shaped tops mounted in said projections, each extension provided with an opening adapted to communicate with the funnel of its respective extension and the opening in its respective projection, a sealing ball in said funnel-shaped top, and a cover mounted in said groove and adapted to be sealed therein.

3. An insect trap comprising a base provided with legs and having a groove extending completely around the edge portion of its upper surface, a plurality of projections extending upward from the portion of said base bounded by said groove, and provided with an opening extending through the base, extensions terminating in funnel-shaped tops mounted on said projections, each extension provided with an opening adapted to communicate with the funnel of its respective extension and the opening in its respective projection, a sealing member in said funnel-shaped top, and a cover mounted in said groove and adapted to be sealed therein.

4. An insect trap comprising a base having a peripheral groove and a plurality of integral hollow projections on its upper surface, hollow extensions terminating in funnel-shaped portions, the hollows in said projections and extensions registering, the hollows of said projections extending through the base, ball sealing members in said funnel-shaped projections, and a cover mounted in said groove.

5. An insect trap comprising a base having a peripheral groove and a plurality of hollow projections in its upper surface, hollow extensions terminating in funnels, the hollows in said projections and extensions registering, the hollows of said projections extending through the base, sealing members in said funnels, and a cover mounted in said groove.

6. An insect trap comprising a base member having elongated vertically arranged tubular ingress passages formed therein, ball sealing means mounted in said passages and normally closing the same, and a top for said trap.

7. An insect trap comprising a base member having an ingress passage, and ball sealing means mounted in and closing said passage at all times except during the ingress of insects past the same.

8. An insect trap comprising a base having a peripheral groove and a plurality of ingress openings therein, a hollow extension mounted over each opening and registering therewith, sealing members in said extensions, and a cover mounted in said groove.

JEAN R. van J. BLINCK.

Copies of this patent may be obtained for five cents each, by addressing the "Commissioner of Patents, Washington, D. C."